(12) United States Patent
Swoish et al.

(10) Patent No.: US 11,173,777 B2
(45) Date of Patent: Nov. 16, 2021

(54) BATTERY PACK MOUNTING SYSTEM AND MOUNTING METHOD

(71) Applicant: Ford Global Technologies, LLC, Dearborn, MI (US)

(72) Inventors: James Lawrence Swoish, Northville, MI (US); Ihab Grace, Grosse Pointe Woods, MI (US); Daniel Miller, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 16/414,194

(22) Filed: May 16, 2019

(65) Prior Publication Data

US 2020/0361300 A1 Nov. 19, 2020

(51) Int. Cl.
*B60K 1/04* (2019.01)
*B60L 50/60* (2019.01)

(52) U.S. Cl.
CPC ............... *B60K 1/04* (2013.01); *B60L 50/66* (2019.02); *B60K 2001/0433* (2013.01)

(58) Field of Classification Search
CPC .................................. B60K 1/04; B21D 28/26
See application file for complete search history.

(56) References Cited

U.S. PATENT DOCUMENTS

| | | | | |
|---|---|---|---|---|
| 236,285 A * | 1/1881 | Wilbur | .................... | B21D 39/10 |
| | | | | 72/123 |
| 1,528,587 A * | 3/1925 | Thackray | ................ | B21D 19/08 |
| | | | | 72/335 |
| 1,580,930 A * | 4/1926 | Thackray | ................ | B21D 19/08 |
| | | | | 72/324 |
| 1,580,931 A * | 4/1926 | Thackray | ................ | B21D 19/08 |
| | | | | 72/342.6 |
| 7,281,696 B2 * | 10/2007 | Kida | .......................... | B60J 5/06 |
| | | | | 248/300 |
| 8,336,657 B2 * | 12/2012 | Dobbins | ................. | B60R 25/00 |
| | | | | 180/68.5 |
| 8,720,976 B2 | 5/2014 | Oyama et al. | | |
| 9,090,025 B2 * | 7/2015 | Balk | ....................... | B29C 66/61 |
| 9,139,074 B2 | 9/2015 | Jarocki | | |
| 9,505,442 B2 | 11/2016 | Wu et al. | | |
| 9,517,686 B1 * | 12/2016 | Paramasivam | .......... | B60K 1/04 |
| 9,884,545 B1 | 2/2018 | Addanki et al. | | |
| 10,065,491 B1 | 9/2018 | Syed et al. | | |

(Continued)

FOREIGN PATENT DOCUMENTS

| | | | | |
|---|---|---|---|---|
| CN | 103009980 A | * | 4/2013 | ............... B60K 1/04 |
| DE | 102012102938 | | 10/2013 | |

(Continued)

*Primary Examiner* — Steve Clemmons
(74) *Attorney, Agent, or Firm* — David Kelley, Esq.; Carlson, Gaskey & Olds, P.C.

(57) ABSTRACT

A battery pack mounting system includes, among other things, a bracket having a first connection flange configured to connect to a vehicle structure, a second connection flange configured to connect to a battery pack, and a spanner portion spanning from the first connection flange to the second connection flange. The bracket includes one or more openings that segment the bracket into at least a first section and a second section. Each of the openings extends into both the spanner portion and the first connection flange.

15 Claims, 6 Drawing Sheets

(56) References Cited

U.S. PATENT DOCUMENTS

| | | | |
|---|---|---|---|
| 2011/0008573 A1* | 1/2011 | Durney | B31F 1/0009 |
| | | | 428/131 |
| 2015/0336155 A1* | 11/2015 | Kawai | B21D 19/08 |
| | | | 72/327 |
| 2017/0084890 A1 | 3/2017 | Subramanian et al. | |
| 2017/0320122 A1* | 11/2017 | Matsuno | B21D 28/14 |
| 2018/0304341 A1* | 10/2018 | Frost | B21C 23/142 |
| 2018/0370467 A1 | 12/2018 | Syed et al. | |
| 2020/0238360 A1* | 7/2020 | Ihara | B21D 28/02 |
| 2020/0239974 A1* | 7/2020 | Ihara | B21D 19/088 |

FOREIGN PATENT DOCUMENTS

| | | | | |
|---|---|---|---|---|
| IN | 201611000882 | | 7/2017 | |
| JP | 2019038403 A | * | 3/2019 | ............ H01M 50/24 |
| JP | 2020011608 A | * | 1/2020 | ............ B62D 25/20 |
| WO | WO-2007082366 A1 | * | 7/2007 | ............ B21D 47/01 |

* cited by examiner

BATTERY PACK MOUNTING SYSTEM AND MOUNTING METHOD

TECHNICAL FIELD

This disclosure relates generally to mounting a battery pack to an electrified vehicle and, more particularly, to mounting the battery pack utilizing a bracket that incorporates energy absorbing features.

BACKGROUND

Generally, electrified vehicles can differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain for an electrified vehicle can include a high-voltage battery pack having battery cells that store electric power for powering the electric machines and other electrical loads of the electrified vehicle. The battery pack can be secured to an underbody, or another area, of an electrified vehicle.

SUMMARY

A battery pack mounting system according to an exemplary aspect of the present disclosure includes, among other things, a bracket having a first connection flange configured to connect to a vehicle structure, a second connection flange configured to connect to a battery pack, and a spanner portion spanning from the first connection flange to the second connection flange. The bracket includes one or more openings that segment the bracket into at least a first section and a second section. Each of the openings extends into both the spanner portion and the first connection flange.

In another exemplary embodiment of the foregoing mounting system, the first connection flange extends transversely from a vertically upper end of the spanner portion in a first direction, and the second connection flange extends transversely from a vertically lower end of the spanner portion in an opposite, second direction.

In another exemplary embodiment of any of the foregoing mounting systems, each of the openings has a circumferential perimeter provided by the bracket. A portion of the circumferential perimeter for each of the openings is provided by a strengthening flange projecting from a primary portion of the spanner portion.

In another exemplary embodiment of any of the foregoing mounting systems, each of the openings includes at least one notch. The at least one notch is vertically above all portions of the strengthening flange for the respective opening.

In another exemplary embodiment of any of the foregoing mounting systems, the first section is less compliant than the second section.

In another exemplary embodiment of any of the foregoing mounting systems, the first section is forward the second section relative to a general orientation of the battery pack and the vehicle structure when the battery pack is secured to the vehicle structure.

Another exemplary embodiment of any of the foregoing mounting systems, includes a plurality of darts in the bracket. The plurality of darts are disposed at an interface between the second connection flange and a vertically lower end of the spanner portion such that a portion of each of the darts is within the second connection flange and another portion of each of the darts is within the spanner portion.

Another exemplary embodiment of any of the foregoing mounting systems includes the battery pack and the vehicle structure. The bracket is on an inboard side of the battery pack when securing the battery pack to the vehicle structure.

A battery pack mounting system according to yet another exemplary aspect of the present disclosure includes a vehicle underbody, a battery pack, and a bracket. The bracket has a first connection flange connected to the vehicle underbody, a second connection flange connected to a battery pack, and a spanner portion extending vertically from the first connection flange to the second connection flange. The bracket includes one or more openings segmenting the bracket into at least a first section and a second section. The first section is less compliant than the second section.

In another exemplary embodiment of the foregoing mounting system, each of the openings extends into both the spanner portion and the first connection flange.

Another exemplary embodiment of any of the foregoing mounting systems includes darts in the bracket. The darts are disposed at an interface between the second connection flange and a vertically lower end of the spanner portion such that a portion of each of the darts is within the second connection flange and another portion of each of the darts is within the spanner portion. Each of the openings has a circumferential perimeter provided by the bracket. At least a portion of the circumferential perimeter for each of the openings is provided by a strengthening flange projecting from a primary portion of the spanner portion. At least a portion of the circumferential perimeter provides a notch that is vertically above the strengthening flange for the respective opening.

A battery pack mounting method according to still another exemplary aspect of the present disclosure includes, among other things, connecting a battery pack to a vehicle underbody with a bracket. The bracket include one or more openings segmenting the bracket into at least a first section and a second section. The first section is less compliant than the second section.

In another exemplary embodiment of the foregoing method, the bracket has a first connection flange connected to the vehicle underbody, a second connection flange connected to a battery pack, and a spanner portion extending vertically from the first connection flange to the second connection flange. Each of the openings extends into both the spanner portion and the first connection flange.

Another exemplary embodiment of the foregoing method includes using a strengthening flange about a portion of a perimeter of the openings to strengthen selected portions of the bracket.

In another exemplary embodiment of any of the foregoing methods, each of the openings includes at least one notch that is vertically above all portions of the strengthening flange for the respective opening.

In another exemplary embodiment of any of the foregoing methods, the bracket includes a plurality of darts disposed at an interface between the second connection flange and a vertically lower end of the spanner portion such that a portion of each of the darts is within the second connection flange and another portion of each of the darts is within the spanner portion.

In another exemplary embodiment of any of the foregoing methods, the first section is forward the second section relative to an orientation of a vehicle having the underbody such that the second section will flex when a load is applied to a side of the vehicle more than the first section to permit a rear area of the battery pack to tilt upward relative to a front area of the battery pack.

In another exemplary embodiment of any of the foregoing methods, the bracket is on an inboard side of the battery pack when securing the battery pack to the vehicle structure.

In another exemplary embodiment of any of the foregoing methods, the one or more openings includes a first opening and a second opening. The first opening segments the first section from the second section. The second opening segments the second section from the third section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a mounting bracket used to secure a battery pack to an underbody of an electrified vehicle. The mounting bracket incorporates features that can help to reduce peak forces on the battery pack when a load, such as a side impact load, is applied to the vehicle. The features also help to keep the battery pack from contacting areas of the underbody as the impact load is applied to the electrified vehicle. The features can help to maintain a connection of the battery pack to the underbody through the mounting bracket after the impact load is applied.

Figure 1:
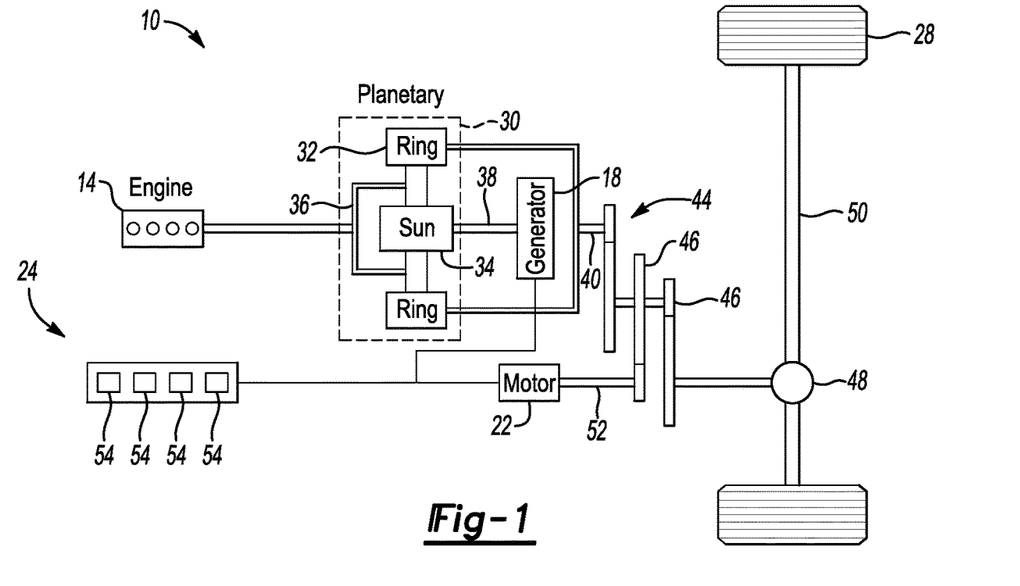
FIG. 1 schematically illustrates an exemplary powertrain of an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and at least one battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to drive the vehicle drive wheels 28.

In the exemplary embodiment, the at least one battery pack 24 is a single battery pack including an enclosure housing a plurality of battery arrays 54. Each of the battery arrays 54 includes a plurality of individual battery cells. Other powertrains could include more than one battery pack each having a separate enclosure.

Figure 2:
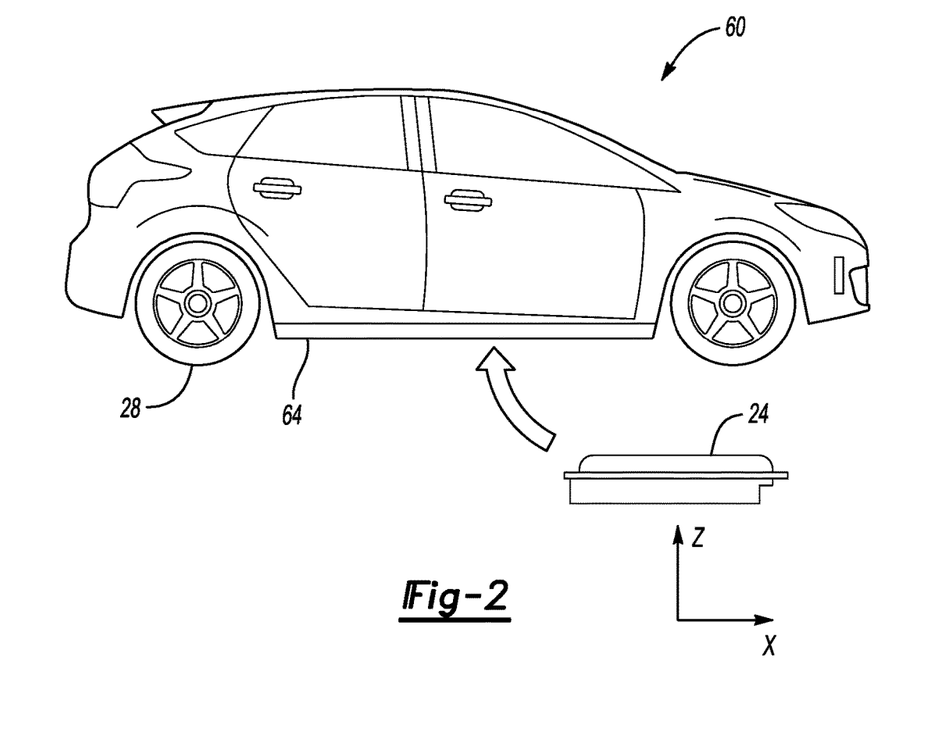
FIG. 2 illustrates a side view of an exemplary electrified vehicle that incorporates the powertrain of FIG. 1 and shows how a battery pack can be secured to a vehicle underbody of the electrified vehicle.
Figure 3:
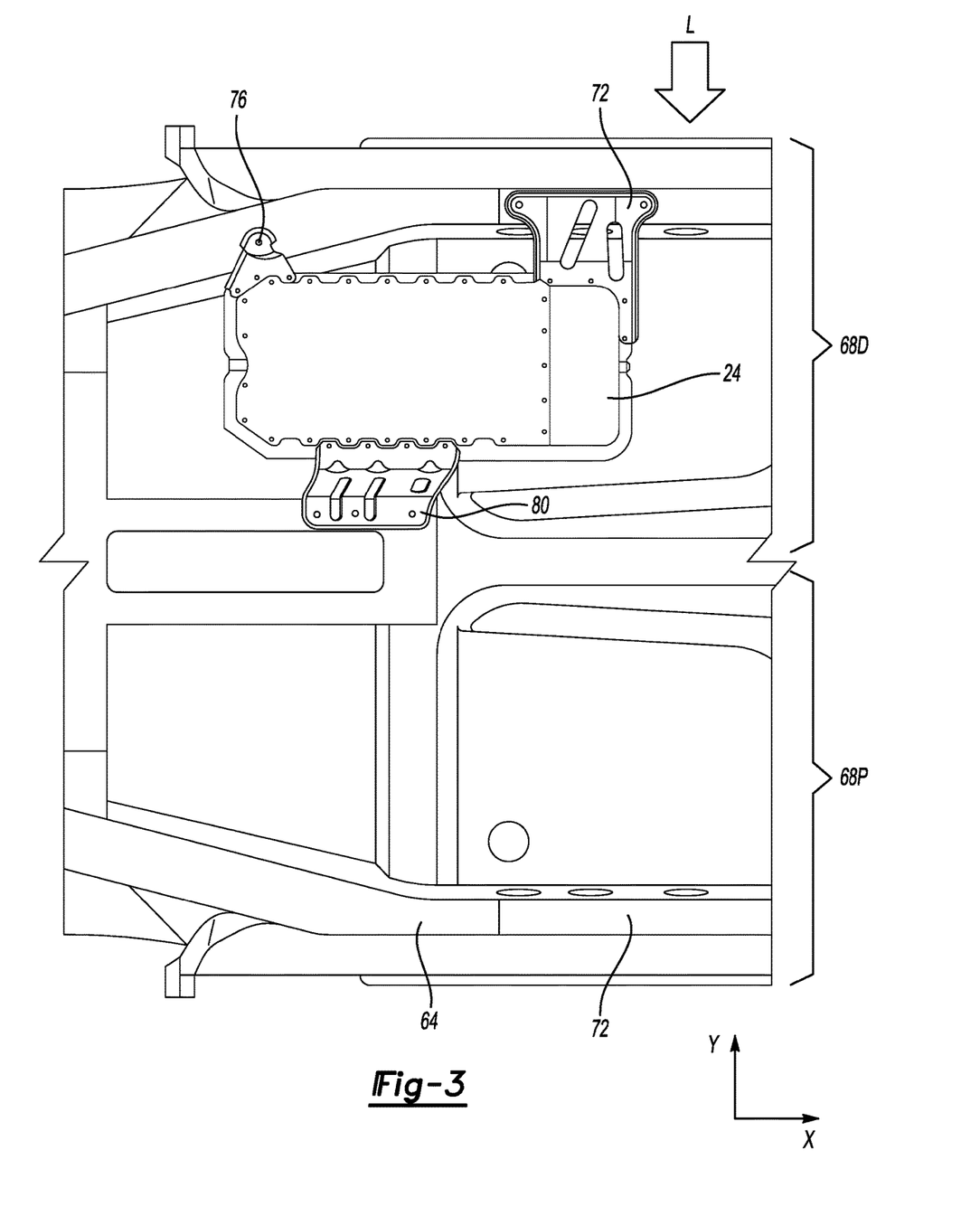
FIG. 3 illustrates a bottom view of the electrified vehicle of FIG. 2 showing the battery pack secured to the vehicle underbody on a driver side of the electrified vehicle.

Referring now to FIGS. 2 and 3 with continued reference to FIG. 1, an electrified vehicle 60 incorporating the powertrain 10 of FIG. 1 includes the battery pack 24 secured to a vehicle structure, here an underbody 64 of the electrified vehicle 60.

The battery pack 24 is secured to the vehicle underbody 64 on a driver side 68D of the electrified vehicle 60. In another example, another battery pack could be secured to the vehicle underbody 64 on a passenger side 68P of the electrified vehicle 60.

In the exemplary embodiment, three mounting brackets are used to secure the battery pack 24 to the vehicle underbody 64. The three mounting brackets included a forward outboard bracket 72, an aft outboard bracket 76, and an inboard bracket 80. The forward outboard bracket 72 is attached to the vehicle underbody 64 and a forward outboard corner of the battery pack 24. The aft outboard bracket 76 is attached to the vehicle underbody 64 and an aft outboard portion of the battery pack 24. The inboard mounting bracket 80 is attached to the vehicle underbody 64 and an inboard side of the respective battery pack 24. The brackets 72, 76, and 80 can be secured to the battery pack 24 and the vehicle underbody 64 using mechanical fasteners, for example.

Other embodiments could use other numbers of brackets to secure the battery pack 24 to the underbody, and the brackets could be disposed at different positions.

Further, although the brackets 72, 76, and 80 secure the battery pack 24 of the powertrain 10, which has a powersplit configuration, the brackets 72, 74, and 80 could secure a battery pack of another type of electrified vehicle powertrain. For example, the bracket 80 could be used to secure a battery pack of a Modular Hybrid Transmission (MHT) powertrain. MHTs can have a single electric machine and a step transmission. Thus, the brackets 72, 74, and 80 should not be considered limited to securing the battery pack 24 of a powertrain having powersplit configurations.

Features are incorporated into the mounting brackets 80 to, among other things, help absorb an impact load while maintaining a connection of the battery pack 24 to the vehicle underbody 64 through the mounting bracket 80. The features can further help to direct movements of the battery pack 24 relative to the vehicle underbody 64 when an impact load is applied to the electrified vehicle 60, particularly an impact load resulting from a side impact.

An example load resulting from a side impact can be a load L applied to the driver side of the electrified vehicle 60 during a side pole impact. A person having skill in this art and the benefit of this disclosure could understand a side pole impact and the testing procedures associated therewith. In side impact tests, the battery pack 24 can be required to maintain a connection to the electrified vehicle 60.

Figure 4:
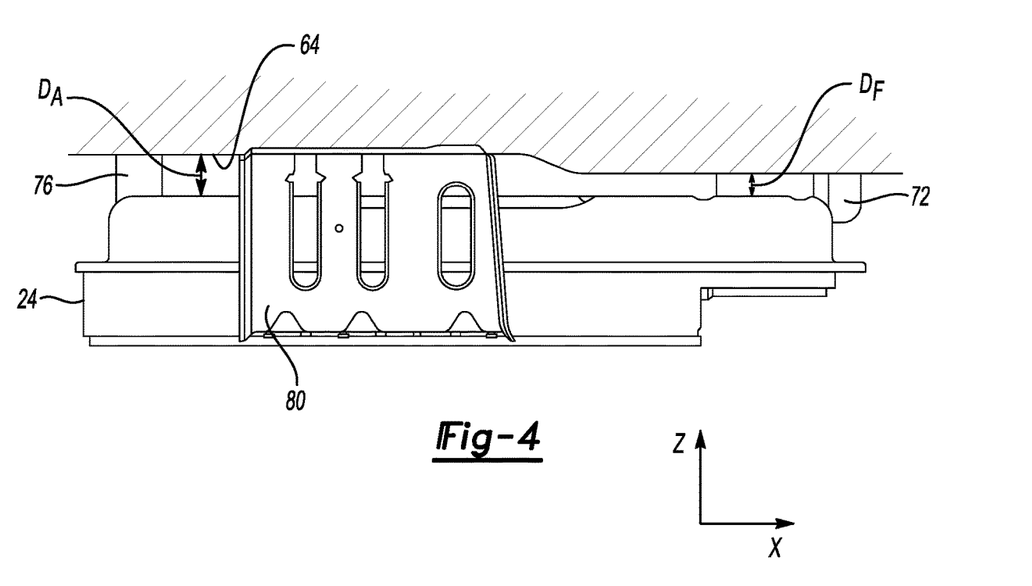
FIG. 4 illustrates a side view of the battery pack prior to a load impacting the driver side of the electrified vehicle.
Figure 5:
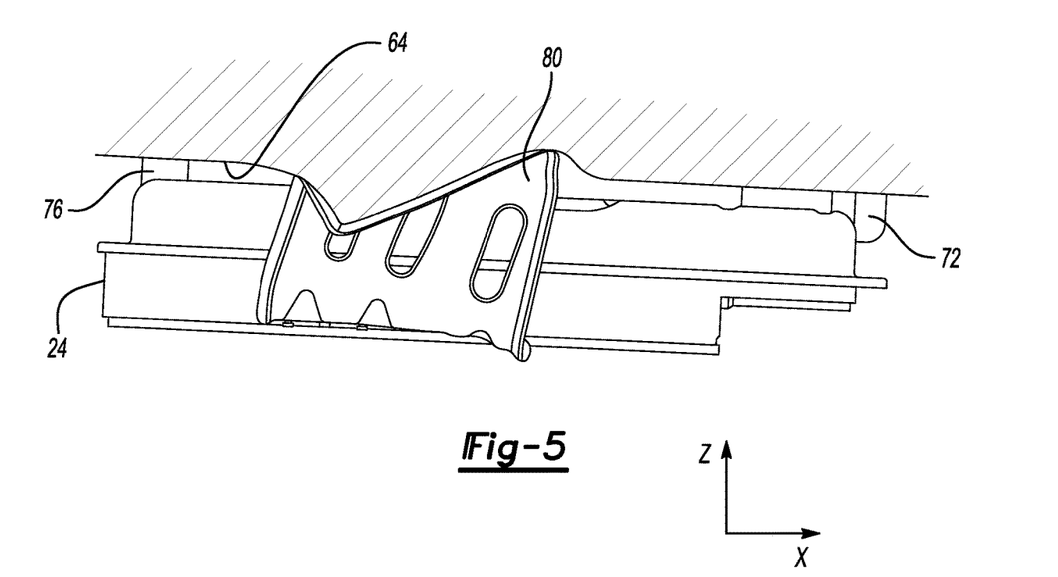
FIG. 5 illustrates the side view of the battery pack after the load impacts the driver side of the electrified vehicle.
Figure 6:
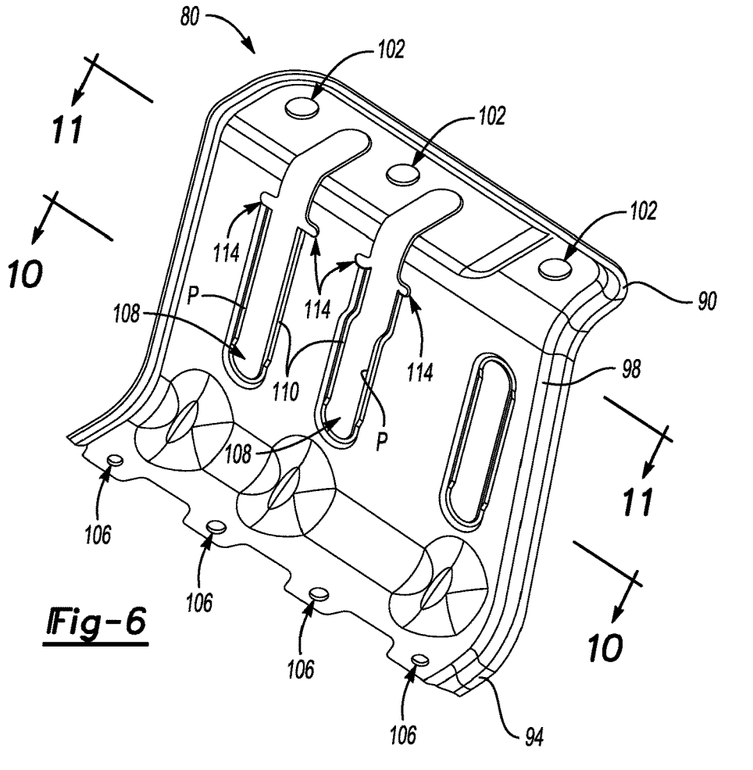
FIG. 6 illustrates a perspective view of a mounting bracket that is used to secure the battery pack.
Figure 7:
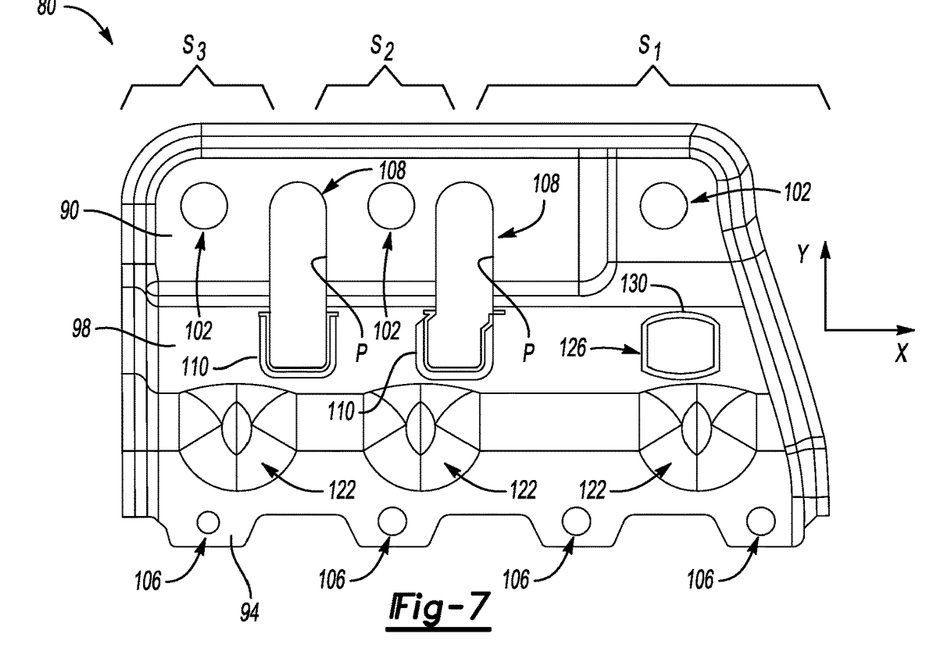
FIG. 7 illustrates a bottom view of the mounting bracket of FIG. 6.

FIG. 4 shows a side view of the battery pack 24 prior to the load L being directed into the driver side of the electrified vehicle 60. FIG. 5 shows the side view of the battery pack 24 after the load L has been directed into the driver side of the electrified vehicle 60. Notably, the load L causes a forward end portion of the battery pack 24 to tilt downward. That is, a forward end portion of the battery pack 24 moves vertically downward in response to the load L relative to an aft end portion of the battery pack 24.

This tilting the battery pack 24 in response to the load L can help to keep the battery pack 24 spaced from the vehicle underbody 64 as the load L is applied. Prior to application of the load L, a vertical distance $D_F$ between the front end portion of the battery pack 24 and the vehicle underbody 64 may be less than a vertical distance $D_A$ between the aft end portion of the battery pack 24 and the vehicle underbody 64. The tilting movement in response to the load L may be necessary to keep the battery pack 24 spaced from the vehicle structure due to the differences between the distances $D_F$ and $D_A$.

The features of the brackets 80 can help to, among other things, facilitate tilting the battery pack 24.

With reference now to FIGS. 6-11 and continuing reference to FIG. 3, the mounting bracket 80 include a first connection flange 90, a second connection flange 94, and a spanner portion 98 spanning from the first connection flange 90 to the second connection flange 94.

The first connection flange 90 is configured to connect directly to the vehicle underbody 64. In the exemplary embodiment, the first connection flange 90 includes apertures 102. Threaded mechanical fasteners, for example, can extend through the apertures 102 to engage the vehicle underbody 64 thereby securing the mounting bracket 80 to the vehicle underbody 64 via the first connection flange 90.

The second connection flange 94 is configured to connect to the battery pack 24. In the exemplary embodiment, the second connection flange 94 includes apertures 106. Threaded mechanical fasteners, for example, can extend through the apertures 106 to threadably engage bosses of the battery pack 24 thereby securing the mounting bracket 80 to the battery pack 24 via the second connection flange 94. The battery pack 24 can include an enclosure having the bosses. The enclosure can be cast aluminum, for example.

Figure 8:
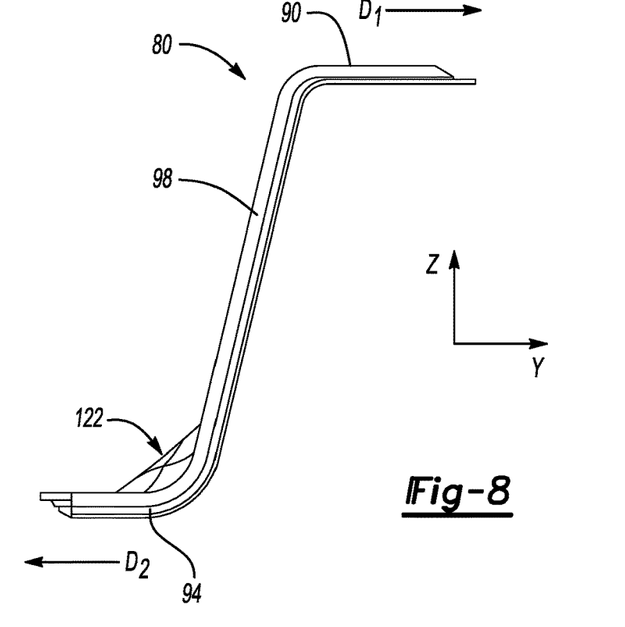
FIG. 8 illustrates an end view of the mounting bracket of FIG. 6.
Figure 9:
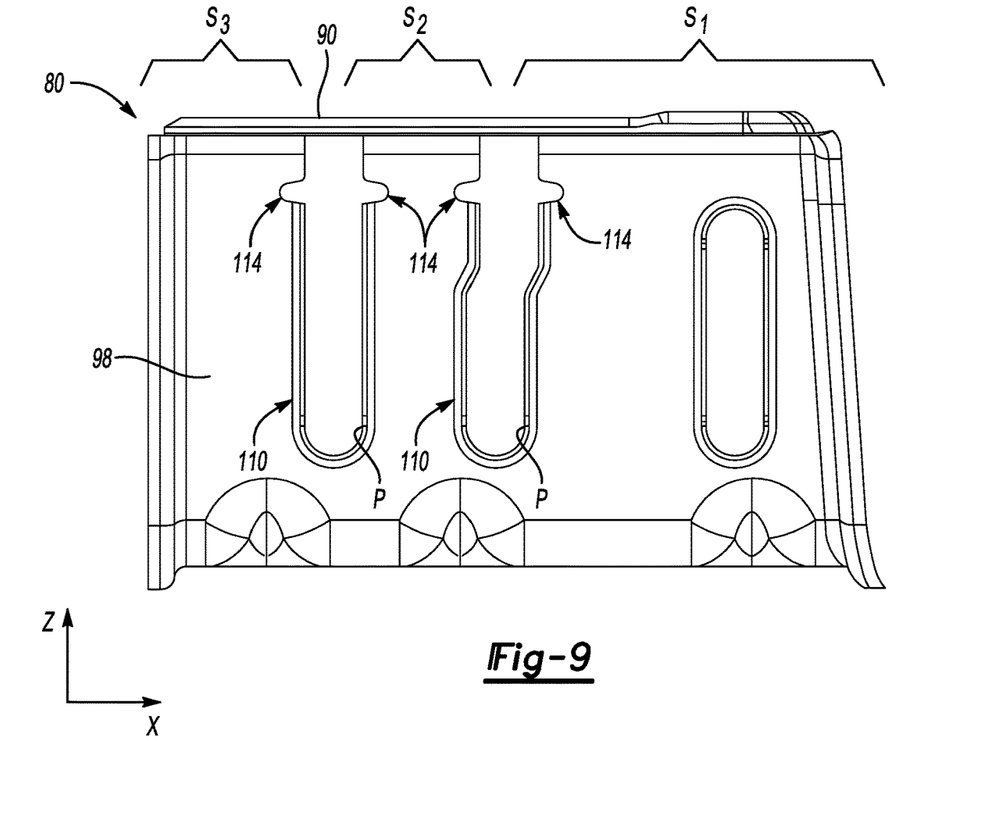
FIG. 9 illustrates a rear view of the mounting bracket of FIG. 6.
Figures 10, 11:
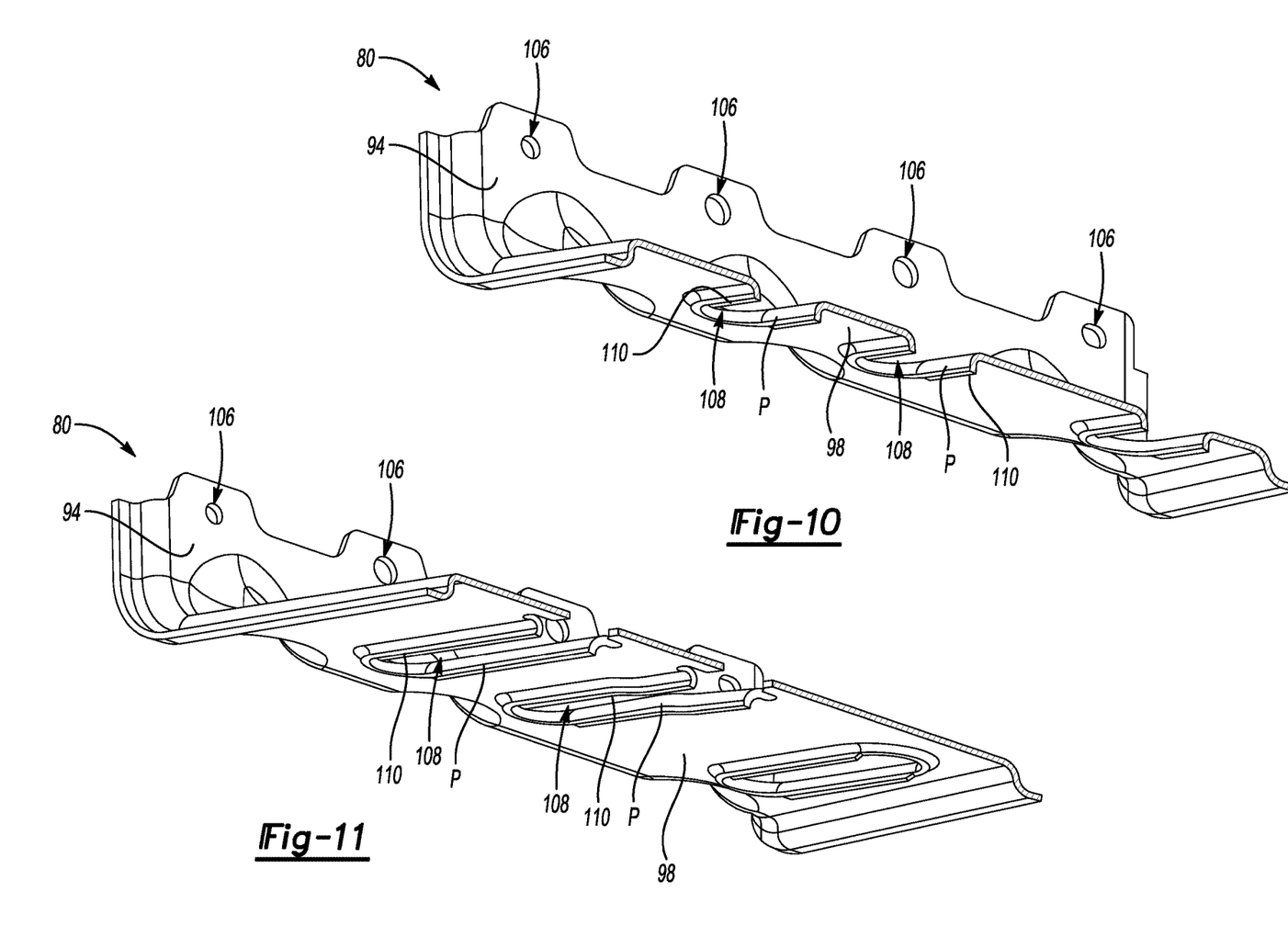
FIG. 10 illustrates a perspective view of a section of the mounting bracket taken along line 10-10 in FIG. 6.
FIG. 11 illustrates a perspective view of another section of the mounting bracket taken along line 11-11 in FIG. 6.

Generally, as shown in FIG. 8, the first connection flange 90 extends transversely from a vertically upper end of the spanner portion 98 in a first direction $D_1$, and the second connection flange 94 extends transversely from a vertically lower end of the spanner portion 98 in a second direction $D_2$.

As features, the bracket 80 includes openings 108. Each of the openings 108 includes a circumferential perimeter P that is provided entirely by the mounting bracket 80. Each of the exemplary openings 108 extends into both the spanner portion 98 and the first connection flange 90. That is, a portion of the perimeter P is provided by both the spanner portion 98 and the first connection flange 90.

In the exemplary embodiment, the bracket 80 includes two of the openings 108. The openings 108, in the exemplary bracket 80, segment the bracket horizontally into three sections $S_1$, $S_2$, and $S_3$.

In the exemplary embodiment, the section $S_1$ is less compliant than the sections $S_2$ and $S_3$. Thus, when a load is applied to a passenger side of the electrified vehicle 60, the sections $S_2$ and $S_3$ of the mounting bracket 80 tend to yield more readily than the section $S_1$. This facilitates the tipping of the battery pack 24 as was discussed above in connection with FIGS. 4 and 5. The yielding helps to prevent cracking the mounting bracket 80 by absorbing energy. This can help to prevent the mounting bracket 80 from separating from the battery pack 24. Excessive forces can cause the mounting bracket 80 to detach from the battery pack 24, the vehicle underbody 64, or both.

Within the spanner portion 98, a portion of the perimeters P of the openings 108 is provided by a strengthening flange 110. The strengthening flange 110 projects outward away from the battery pack 24 held by the mounting bracket 80 relative to other primary areas of the spanner portion 98. In another example, the strengthening flange 110 projects laterally toward the battery pack 24 held by the mounting bracket 80 relative to other primary areas of the spanner portion 98. The strengthening flange 110 can strengthen these portions of the perimeter P. The strengthening flange 110 can help to prevent crack propagation within the mounting bracket 80.

The openings 108 each include at least one notch 114. In the exemplary embodiment, the notches 114 are vertically above the respective strengthening flanges 110. The notches 114 are disposed on opposing horizontal sides of the openings 108. The notch 114 extends horizontally past the strengthening flanges 110.

The notches 114 can facilitate yielding of the mounting bracket 80 in the area of the notches 114. Using the strengthening flanges 110 to strengthen the areas of the openings 108 vertically below the notches 114 can further help to ensure yielding in the areas of the notches 114. Yielding in this vertical area of the mounting bracket 80 can facilitate the movement of the battery pack described in connection with FIGS. 4 and 5 as the load L is applied.

The notches 114 and the strengthening flanges 110 help to make the second segment $S_2$ and the third segment $S_3$ more compliant than the first section.

The bracket 80 includes a plurality of darts 122. In this example, the darts are disposed at an interface between the second connection flange 94 and the spanner portion 98 such that a portion of each of the darts 122 is within the second connection flange 94 and another portion of each of the darts 122 is within the spanner portion 98.

The darts 122 can strengthen the interface between the spanner portion 98 and the second connection flange 94 to, among other things, help to prevent the second connection flange 94 from separating from the battery pack 24.

The first section $S_1$ of the mounting bracket 80 includes, in the exemplary embodiment, a strengthening opening 126. The strengthening opening 126 is provided entirely within the spanner portion 98 of the mounting bracket 80.

A flange 130 from the spanner portion 98 provides an entire circumferential perimeter of the strengthening opening 126 in this example. The strengthening opening 126 differs from the openings 108 due to, among other things, the strengthening opening 126 residing entirely within the spanner portion 98 rather than including a portion extending into the first connection flange 90. The strengthening opening 126, in part due to the flange 130, can strengthen the first section $S_1$ to help to ensure that the second segment $S_2$ and the third segment $S_3$ are more compliant than the first section.

When installed within the vehicle, the first section $S_1$ of the brackets 80 are forward the second section $S_2$ and the third section $S_3$. Due to the first section $S_1$ being less compliant than the second section $S_2$ and third section $S_3$, the sections $S_2$ and $S_3$ will tend to deform in response to the load prior to the first section $S_1$. This can facilitate the tipping of the battery pack 24 as described in connection with FIGS. 4 and 5. The tipping can help to prevent the vehicle underbody 64 and the battery pack 24 from contacting each other, which could undesirably result in the battery pack 24 being forced open to expose the battery cells. The deformation of the bracket can also help to absorb some of the load L to reduce the amount of the load L transferred to the battery pack 24, and through the connections between the mounting bracket 80, the battery pack 24, and the vehicle underbody 64.

The sizes of the sections $S_1$, $S_2$, and $S_3$ can be adjusted to help to provide the desired yielding of the mounting bracket 80. Changing the sizes of the sections $S_1$, $S_2$, and $S_3$ could include changing a horizontal width of the openings 108. Additional openings 108 could be added, or one of the openings 108 could be removed, to change the number of sections $S_1$, $S_2$, and $S_3$. Altering the number of sections $S_1$, $S_2$, and $S_3$ can further help to provide a desired yielding of the mounting bracket 80. Thus, a desired bend vector for the mounting bracket 80 can be altered by changing, among other things, a size of the sections $S_1$, $S_2$, and $S_3$ and a number of the sections $S_1$, $S_2$, and $S_3$. The vertical height of the openings 108 could also be altered to provide a desired behavior of the mounting bracket 80 when loaded.

Further, the exemplary bracket 80 can be a metal or metal alloy. The precise material composition of the mounting bracket 80 can further be modified to provide a desired behavior when loaded. The material composition could be something other than a metal or metal alloy in some examples.

Features of some of the disclosed examples include a bracket that secures a battery structure and includes areas that are more compliant than other areas. This facilitates a desired motion of the battery pack in response to an impact load.

Under normal vehicle operation and loads, the bracket acts as a stiff supporting brace. In response to a higher impact load, the bracket effectively acts as multiple individual brackets due to the openings segmenting the bracket into differing sections. The bracket can help to transfer load to the underbody of the vehicle rather than to the battery pack, and particularly where the bracket connects to the battery pack. Lessening load where the bracket connects to the battery pack can help to help to prevent cracking of bosses in the battery pack that connect the battery pack to the bracket.

The openings of the bracket help to isolate and prevent crack propagation across the bracket as well as the attaching structures by complying in desired areas thereby absorbing energy to reduce forces. The segmenting of the bracket can help to prevent material and crack propagation thereby improving retention performance of the bracket.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack mounting system, comprising:
    a bracket having a first connection flange configured to connect to a vehicle structure, a second connection flange configured to connect to a battery pack, and a spanner portion spanning from the first connection flange to the second connection flange,
    the bracket including one or more openings segmenting the bracket into at least a first section and a second section, each of the openings extending into both the spanner portion and the first connection flange,
    wherein the first section is less compliant than the second section,
    wherein the first section is forward the second section relative to a general orientation of the battery pack and the vehicle structure when the battery pack is secured to the vehicle structure.

2. The battery pack mounting system of claim 1, wherein the first connection flange extends transversely from a vertically upper end of the spanner portion in a first direction, and the second connection flange extends transversely from a vertically lower end of the spanner portion in an opposite, second direction.

3. The battery pack mounting system of claim 1, further comprising a plurality of darts in the bracket, the plurality of darts disposed at an interface between the second connection flange and a vertically lower end of the spanner portion such that a portion of each of the darts is within the second connection flange and another portion of each of the darts is within the spanner portion.

4. The battery pack mounting system of claim 1, further comprising the battery pack and the vehicle structure, wherein the bracket is on an inboard side of the battery pack when securing the battery pack to the vehicle structure.

5. A battery pack mounting system, comprising:
a bracket having a first connection flange configured to connect to a vehicle structure, a second connection flange configured to connect to a battery pack, and a spanner portion spanning from the first connection flange to the second connection flange,
the bracket including one or more openings segmenting the bracket into at least a first section and a second section, each of the openings extending into both the spanner portion and the first connection flange,
wherein each of the openings has a circumferential perimeter provided by the bracket, wherein a portion of the circumferential perimeter for each of the openings is provided by a strengthening flange projecting from a primary portion of the spanner portion,
wherein each of the openings includes at least one notch, the at least one notch vertically above all portions of the strengthening flange for the respective opening.

6. A battery pack mounting system, comprising:
a vehicle underbody;
a battery pack; and
a bracket having a first connection flange connected to the vehicle underbody, a second connection flange connected to the battery pack, and a spanner portion extending vertically from the first connection flange to the second connection flange,
the bracket including one or more openings segmenting the bracket into at least a first section and a second section, the first section is less compliant than the second section,
wherein the first section is forward the second section relative to an orientation of a vehicle having the underbody such that the second section will flex when a load is applied to a side of the vehicle more than the first section to permit a rear area of the battery pack to tilt upward relative to a front area of the battery pack.

7. The battery pack mounting system of claim 6, wherein each of the openings extend into both the spanner portion and the first connection flange.

8. The battery pack mounting system of claim 7, further comprising a plurality of darts in the bracket, the plurality of darts disposed at an interface between the second connection flange and a vertically lower end of the spanner portion such that a portion of each of the darts is within the second connection flange and another portion of each of the darts is within the spanner portion,
wherein each of the openings has a circumferential perimeter provided by the bracket, wherein at least a portion of the circumferential perimeter for each of the openings is provided by a strengthening flange projecting from a primary portion of the spanner portion, wherein at least a portion of the circumferential perimeter provides a notch that is vertically above the strengthening flange for the respective opening.

9. A battery pack mounting method, comprising:
connecting a battery pack to a vehicle underbody with a bracket, the bracket including one or more openings segmenting the bracket into at least a first section and a second section, the first section less compliant than the second section;
wherein the first section is forward the second section relative to an orientation of a vehicle having the underbody such that the second section will flex when a load is applied to a side of the vehicle more than the first section to permit a rear area of the battery pack to tilt upward relative to a front area of the battery pack.

10. The battery pack mounting method of claim 9, wherein the bracket has a first connection flange connected to the vehicle underbody, a second connection flange connected to a battery pack, and a spanner portion extending vertically from the first connection flange to the second connection flange, wherein each of the openings extend into both the spanner portion and the first connection flange.

11. The battery pack mounting method of claim 10, further comprising using a strengthening flange about a portion of a perimeter of the openings to strengthen selected portions of the bracket.

12. The battery pack mounting method of claim 11, wherein each of the openings includes at least one notch that is vertically above all portions of the strengthening flange for the respective opening.

13. The battery pack mounting method of claim 10, wherein the bracket includes a plurality of darts disposed at an interface between the second connection flange and a vertically lower end of the spanner portion such that a portion of each of the darts is within the second connection flange and another portion of each of the darts is within the spanner portion.

14. The battery pack mounting method of claim 9, wherein the bracket is on an inboard side of the battery pack when securing the battery pack to the vehicle structure.

15. The battery pack mounting method of claim 9, wherein the one or more openings includes a first opening and a second opening, the first opening segmenting the first section from the second section, the second opening segmenting the second section from a third section.

* * * * *